United States Patent
Tran et al.

(10) Patent No.: US 12,288,278 B2
(45) Date of Patent: Apr. 29, 2025

(54) LAYERING MODIFICATIONS DEFINED IN A RULE ON A SET OF OBJECTS DETECTED WITHIN A FRAME

(71) Applicant: THE WEATHER COMPANY, LLC, Brookhaven, GA (US)

(72) Inventors: Thai Quoc Tran, San Jose, CA (US); Cindy Han Lu, San Jose, CA (US); Megan Kostick, Edmonds, WA (US); Michael Brewer, Austin, TX (US)

(73) Assignee: The Weather Company, LLC, Brookhaven, GA (US)

( * ) Notice: Subject to any disclaimer, the term of this patent is extended or adjusted under 35 U.S.C. 154(b) by 33 days.

(21) Appl. No.: 17/959,972

(22) Filed: Oct. 4, 2022

(65) Prior Publication Data
US 2024/0112382 A1  Apr. 4, 2024

(51) Int. Cl.
G09G 5/00 (2006.01)
G06F 40/143 (2020.01)
G06T 11/60 (2006.01)
G06V 20/20 (2022.01)

(52) U.S. Cl.
CPC ............ *G06T 11/60* (2013.01); *G06F 40/143* (2020.01); *G06V 20/20* (2022.01)

(58) Field of Classification Search
CPC ......... G06T 11/60; G06T 19/00; G06T 11/00; G06T 11/20; G06F 9/4443; G06F 3/0481; G06F 30/13; G06F 3/04845; G06F 3/04883; G06F 40/143; G06V 20/20
USPC ........................................................ 345/619
See application file for complete search history.

(56) References Cited

U.S. PATENT DOCUMENTS

| | | | |
|---|---|---|---|
| 6,822,648 B2 | 11/2004 | Furlong et al. |
| 6,879,946 B2 | 4/2005 | Rong et al. |
| 7,260,249 B2 | 8/2007 | Smith |
| 8,797,321 B1 | 8/2014 | Bertolami et al. |
| 10,848,335 B1 | 11/2020 | Roche |
| 11,284,646 B2 | 3/2022 | Janardhan et al. |

(Continued)

FOREIGN PATENT DOCUMENTS

| | | |
|---|---|---|
| EP | 1638028 A2 | 3/2006 |
| JP | 4506966 B2 | 7/2010 |
| JP | 2019526878 A | 9/2019 |

*Primary Examiner* — Gordon G Liu
(74) *Attorney, Agent, or Firm* — Barnes & Thornburg LLP

(57) ABSTRACT

A computer-implemented method according to one embodiment includes performing object detection on a frame to identify a set of objects within the frame, and determining a location of each object of the set of objects within the frame. The method further includes constructing a code tree structure for the frame. The code tree structure defines the determined locations. A rule defining modifications to make to at least some of the objects is received and the code tree structure is crawled. The rule is applied to the objects during the crawling. The method further includes layering the modifications defined in the rule on the set of objects within the frame. A computer program product according to another embodiment includes a computer readable storage medium having program instructions embodied therewith. The program instructions are readable and/or executable by a computer to cause the computer to perform the foregoing method.

20 Claims, 11 Drawing Sheets

(56) References Cited

U.S. PATENT DOCUMENTS

| | | | | |
|---|---|---|---|---|
| 2014/0298159 A1* | 10/2014 | Kim | ................... | G06F 40/143 |
| | | | | 715/234 |
| 2016/0085863 A1 | 3/2016 | Allen et al. | | |
| 2016/0203586 A1 | 7/2016 | Chang et al. | | |
| 2016/0321218 A1* | 11/2016 | Farncombe | ........... | G06F 40/143 |
| 2017/0196260 A1 | 7/2017 | Kobal et al. | | |
| 2020/0054939 A1 | 2/2020 | Golden et al. | | |
| 2020/0167120 A1* | 5/2020 | Rakshit | ................ | H04L 67/131 |
| 2021/0334612 A1 | 10/2021 | Gaash et al. | | |
| 2022/0053069 A1* | 2/2022 | Hwang | ................ | G06F 3/0482 |

\* cited by examiner

500

```
.world{
  .nature{
    .tree{
      .leaf{
        style: autumn;
      }
    }
  }
  .flag{
    color: blue;
    // one instance of the flag
    #striped flag{
      replace: bacon;
    }
  }
  .flower{
    replace: carrot;
  }
  .city{
    .wall{
      .mold{
        display: none;
      }
    .art{
      .people{
        size: smaller;
        .man{
          replace: bunny;
        }
        .child{
          replace: pig;
      //child + sewing machine
      &.sewing-machine{
        replace: stovetop;
      }
        }
      }
    }
    //all sewing machines
    .sewing-machine{
    replace: black-box;
    }
    }
   }
  }
 }
}
```

LAYERING MODIFICATIONS DEFINED IN A RULE ON A SET OF OBJECTS DETECTED WITHIN A FRAME

BACKGROUND

The present invention relates to objects of a frame, and more specifically, this invention relates to layering modifications defined in a set of rules on a set of objects detected within a frame.

Cascading Style Sheets (CSS) describes a language used to style webpages. An example of this is defining a relatively "dark" and relatively "light" mode for users. Augmented Reality (AR) is an emerging realm of enhancing a user's real time environment digitally. Examples of AR that have gained popularity include application filters, real-time language translation applications, etc.

SUMMARY

A computer-implemented method according to one embodiment includes performing object detection on a frame to identify a set of objects within the frame, and determining a location of each object of the set of objects within the frame. The method further includes constructing a code tree structure for the frame. The code tree structure defines the determined locations. A rule defining modifications to make to at least some of the objects is received and the code tree structure is crawled. The rule is applied to the objects during the crawling. The method further includes layering the modifications defined in the rule on the set of objects within the frame.

A computer program product according to another embodiment includes a computer readable storage medium having program instructions embodied therewith. The program instructions are readable and/or executable by a computer to cause the computer to perform the foregoing method.

A system according to another embodiment includes a processor, and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
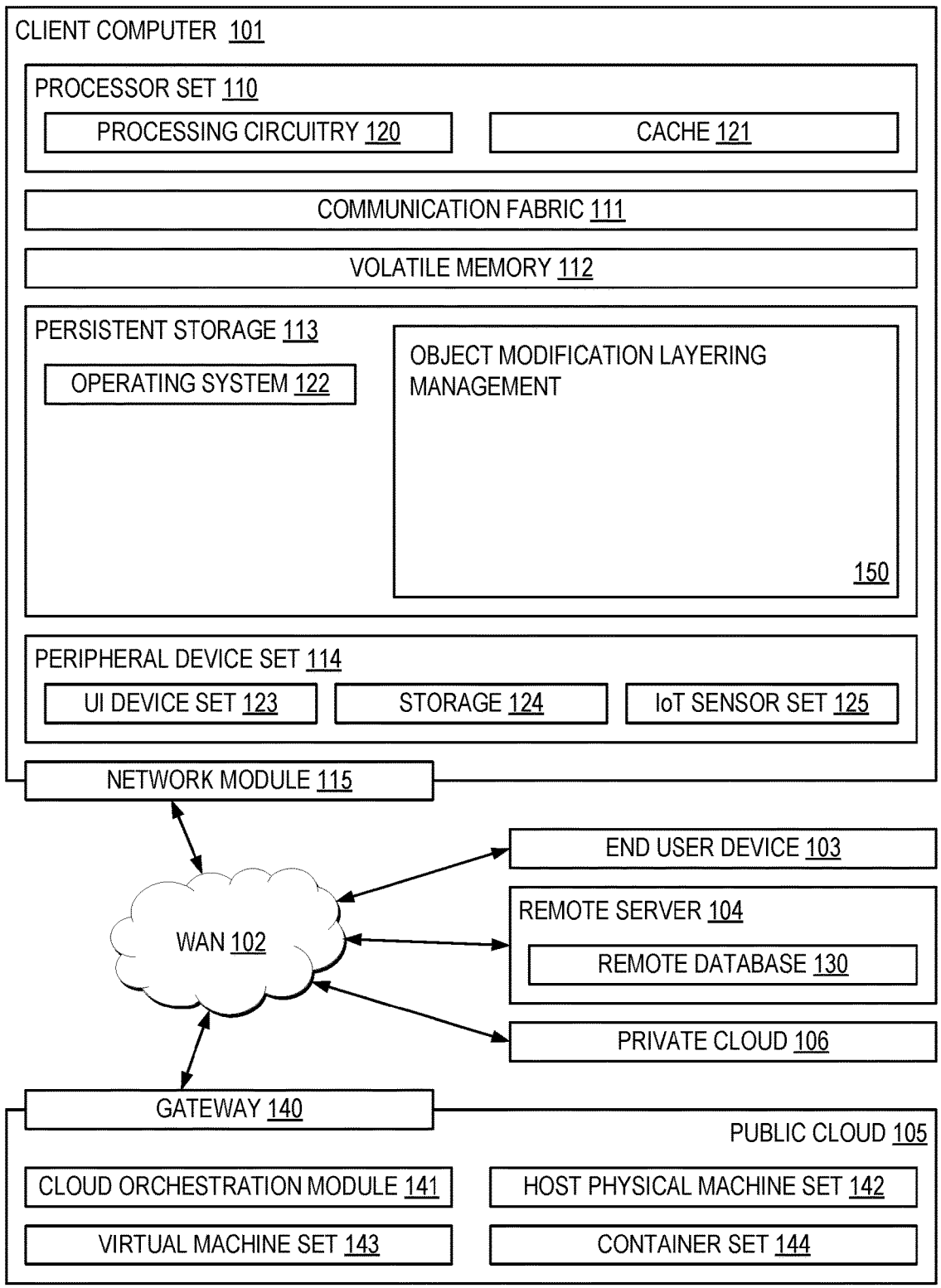
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for layering modifications defined in a set of rules on a set of objects detected within a frame.

In one general embodiment, a computer-implemented method includes performing object detection on a frame to identify a set of objects within the frame, and determining a location of each object of the set of objects within the frame. The method further includes constructing a code tree structure for the frame. The code tree structure defines the determined locations. A rule defining modifications to make to at least some of the objects is received and the code tree structure is crawled. The rule is applied to the objects during the crawling. The method further includes layering the modifications defined in the rule on the set of objects within the frame.

In another general embodiment, a computer program product includes a computer readable storage medium having program instructions embodied therewith. The program instructions are readable and/or executable by a computer to cause the computer to perform the foregoing method.

In another general embodiment, a system includes a processor, and logic integrated with the processor, executable by the processor, or integrated with and executable by the processor. The logic is configured to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as object modification layering management in block 150. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

As mentioned elsewhere above, CSS describes a language used to style webpages. An example of this is defining a relatively "dark" and relatively "light" mode for users. AR is an emerging realm of enhancing a user's real time environment digitally. Examples of AR that have gained popularity include application filters, real-time language translation applications, etc.

Conventional AR applications are created with one format, e.g., look and feel, is universal to all users of the application. In other words, conventional AR applications fail to incorporate any degree of customization. For example, a creature of a frame of a conventional AR application is likely to look the same for all users. In sharp contrast to the deficiencies of various conventional techniques described above, the techniques of various embodiments and approaches described herein enhance user experience by applying CSS rules to a hierarchical structure in a real world frame. For example, applying customization to a real world frame may layer a tropical patterned shirt and sunglasses on a creature in response to a determination that a user, e.g., that is viewing the real world frame through AR glasses, and/or the objects of the frame being located in a tropical locale. Objects and locations may be nested in a tree, where each node is either an object or a location. There are also two types of objects, e.g., those that are known and those that are unknown. Known objects are cached and confirmed while unknown objects are preferably identified. Once these unknown objects are identified, predetermined applicable CSS rules may be applied to the identified objects. Such embodiments and approaches may make two primary assumptions. First, it may be assumed that a system is in place for recognizing objects from an image/video, e.g., such as Watson Visual Recognition by IBM. Alternatively, it may be assumed that a system is in place for ray casting to determine objects in a scene. Second, it may be assumed that a system is in place for identifying virtual objects. As will be described in greater detail elsewhere below, some primary goals of the various embodiments and approaches described herein may be broken down into three parts. First, a reduction of a scene into a tree-like structure where each node is an object, second, an application of CSS rules onto matching objects, and third, layering of matching virtual objects onto real objects.

Figure 2:
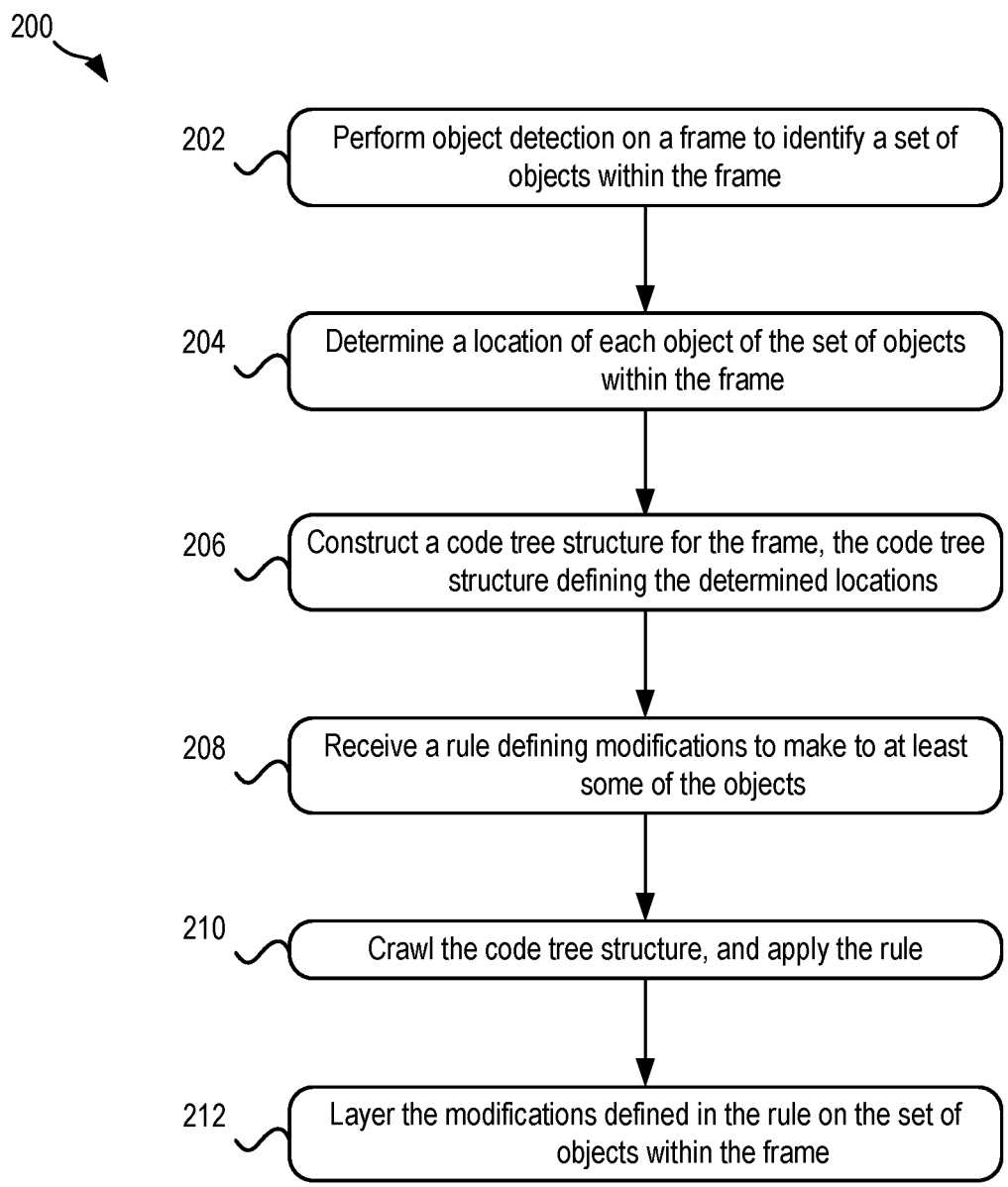
FIG. 2 is a flowchart of a method, in accordance with one embodiment of the present invention.

Now referring to FIG. 2, a flowchart of a method 200 is shown according to one embodiment. The method 200 may be performed in accordance with the present invention in any of the environments depicted in FIGS. 1-8B, among others, in various embodiments. Of course, more or fewer operations than those specifically described in FIG. 2 may be included in method 200, as would be understood by one of skill in the art upon reading the present descriptions.

Each of the steps of the method 200 may be performed by any suitable component of the operating environment. For example, in various embodiments, the method 200 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Operation 202 includes performing object detection on a frame to identify a set of objects within the frame. For context, in some approaches the frame may be based on a perspective that is observed by an AR viewing device, e.g., such as AR glasses, a device display, virtual reality (VR) glasses, a front facing camera device with a display component, etc. For example, the frame may capture about a perspective that user observes at a predetermined time. The frame may include any one or more predetermined types of objects that may be observed by a user, e.g., a statue, a flag, a light post, a stroller, a cloud, a building, a window, etc. The objects may additionally and/or alternatively include living organisms, e.g., people, animals, plants, etc., although in some approaches living organisms may be identified during object detection and intentionally excluded from the set of objects. Accordingly, in some approaches, the frame includes at least some of the objects that a view also observes while wearing an AR viewing device.

One or more techniques for performing object detection that would become appreciated by one of ordinary skill in the art upon reading various of the descriptions herein may be used to perform the object detection. These may include known techniques for recognition and classification of an unknown image to establish a known image. In some approaches existing frameworks such as OPENCV and/or IMAGEAI may be leveraged to identify objects in a the frame, e.g., such as where the frame is an image or video.

Performing object detection may additionally and/or alternatively include outputting the frame to another processing device to assist in performing object detection on the frame. According to a more specific approach, another processing device may be instructed to perform object detection on at least some predetermined portions of the frame. This may be performed while a processing device, e.g., a computer that is performing method 200, performs object detection on other predetermined portions of the frame, e.g., to thereby create efficiencies and not overwhelm processing resources of a single device while performing the object detection.

A location of each object of the set of objects within the frame is determined, e.g., see operation 204. For context, in some approaches, at least one of the determined locations is determined with respect to at least another one of the objects of the set of objects. In some approaches, a location of an object in a frame may be determined based on knowing the location of another object of the set of objects. For example, assuming that a Global Positioning System (GPS) location of a first object is known, a known technique for performing size comparisons between two objects may be used to determine a location of a second location. In another approach, triangulation techniques may be used to determine the location of at least a first object with respect to at least one other object detected within the frame. At least one of the determined locations may additionally and/or alternatively be determined with respect to a GPS location of at least another one of the objects of the set of objects. Known locations and/or landmark, e.g., a town, a bridge, a city, a landmark, a river, a monument, a castle, a restaurant location, coordinates, etc., GPS locations may be used to determine the GPS locations of the objects, assuming that the known locations and the objects exist in the same frame. For example, in some approaches, a determined object of the frame may be identified as a well known tourist attraction, e.g., such as the Eiffel Tower. Based on a determination that the object is the Eiffel Tower, a GPS location of the Eiffel Tower may be determined, e.g., using a map application, a map provider, using a web search, using a GPS location service, etc.

Operation 206 includes constructing a code tree structure for the frame. The code tree structure preferably defines the determined locations of each object of the set of objects within the frame. The code tree structure is in some approaches a cascading style sheet (CSS) language tree. Accordingly, one or more techniques for constructing a CSS language tree that would become appreciated by one of ordinary skill in the art upon reading various of the descriptions herein may be used to construct the code tree structure for the frame. It is important to note that the determined locations may be considered special objects with GPS coordinates. In some preferred approaches, relationships among all of the objects in the world may be defined, e.g., hereafter referred to as a "world tree." However, this extent of relationships may take time to develop and therefore a subset of objects may optionally suffice up to an extent of a user's CSS preferences and available compute power of a computer device that is used to perform method 200. In one illustrative example, the code tree structure for the frame may be initialized by identifying important landmarks in a vicinity of the user, e.g., the user that is using the user device that captured the frame. As the user walks around, the code tree structure continuously updated. Note that more than one frame may be considered and analyzed in this updating process.

In some approaches, a base of the code tree structure depends on a GPS location of the user and/or predetermined important landmarks identified via a map provider. Known techniques for image processing may be used to add additional identifiable objects to this base tree. The user may additionally have personal rules that are then merged and applied on top of this tree, e.g., including living organisms, excluding living organisms from the tree, preference to objects that are determined to be at least a predetermined size, preference to predetermined historic landmarks over non-historic objects, etc. In some preferred approaches, an overview of the rules for constructing the code tree structure include using GPS location and landmarks from a map service provider. This allows the user or entity, e.g., in the event of a location like a theme park, the ability to set GPS bounded CSS themes that are applied to layering of modifications on objects of the frame, e.g., see operation 212 described elsewhere herein. The rules for constructing the code tree structure may additionally and/or alternatively include applying image recognition and classification techniques on unknown objects in order to establish known objects. For example, unknown objects may be input into image recognition and classification techniques in order to become known objects, while unknown objects that are unable to be classified may optionally be simply left out of the CSS applicable code tree structure. The rules for constructing the code tree structure may additionally and/or alternatively include creating bounding boxes for the objects, e.g., a boundary box that the object is located within on a three-dimensional (3-D) frame. In some approaches in which the objects have bounding boxes, it may be determined if any objects are inside the bounding box of another object. For example, it may be determined whether a first object of the set of objects is inside of a bounding box of a second object of the set of objects. This may occur for example, where a first object has a second object that from a perspective of the frame sits over the first object, e.g., a kite that is the second object in the current example is flying in front of a large building that is the first object. Such a determination may be based on whether one or more of the bounding boxes overlap. For example, in response to a determination that a bounding box of a first object overlaps a bounding box of a second object and/or entirely resides within the bounding box of the second object, it may be determined that the first object of the set of objects is inside of the bounding box of a second object of the set of objects. In response to such a determination, method 200 may optionally include nesting the first object under the second object. For example, in some approaches, constructing the code tree structure for the frame includes determining a first of the objects that exists inside of a predetermined bounding box of a second of the objects, and nesting the first object under the second object.

In some approaches, a boundary trace may additionally and/or alternatively be established for each of the objects, e.g., contours of the objects. Such a boundary trace may be useful for defining a boundary of the object to modify, e.g., remove, enlarge in size, decrease in size, change a color of, etc., as will be described elsewhere herein in operation 212 of method 200.

Operation 208 includes receiving at least one rule defining at least one modification to make at least some of the objects of the set of objects. In some approaches, a set of rules are received that define modifications to make to at least some of the objects. In some approaches, the rule defines a modification to be made to an attribute associated with at least one of the objects of the set of objects. In one preferred approach, the attribute may be colors within the frame and/or objects of the frame. Accordingly, the rule may be applied to all colors that are present in the frame and/or present in an object of the frame. For example, the rule may specify that all colors of the objects are to be intensified to a predetermined intensity. In another example, the rule may specify that all colors of the objects are to be modified to a black and white color scheme. The rule may additionally and/or alternatively define a modification to be made to a variable associated with at least one of the objects of the set of objects. In one preferred approach, the variables may be values within the frame and/or objects of the frame. For example, the values may specify a subset of colors that a predetermined modification is to be applied to. According to a more specific example, the variables may be the colors blue, red and yellow, and the rule may specify that objects having such colors are to remain with a predetermined clarity in the frame, while objects that do not contain such colors are to be modified to a black and white color scheme and blurred. In one use case example, subsequent to this rule being applied to the frame, objects that include the predetermined variable colors are readily the focus of the frame and other objects are not the focus of the frame and blurred out with color modification. The rule may additionally and/or alternatively define at least one of the objects to be replaced with a virtual object, e.g., where an entirety of the at least one object is replaced with the virtual object and thereafter does not exist in the modified frame. For example, in one use case the virtual object may be a cartoon version of the replaced object. Assuming that a user that would be viewing a frame with the virtual object is a fan of cartoons, this may enable the object to appeal to the interests of the user. In another approach, assuming that the replaced object is one that would otherwise scare a user, e.g., such as Halloween themed statute, application of the rule to replace the object with the virtual object may prevent the user from becoming afraid. Some further key concepts of such rules may include additional variables. For example, the rule may define variables to replace in a day or night mode. In yet another approach, the rule may additionally and/or alternatively incorporate inheritance. For example, a rule that incorporate inheritance may specify that all objects that are gadgets in a kitchen should be gold. Based on this rule, a spoon is a kitchen gadget and should therefore be gold. Assuming that it is determined that a spoon is not gold, application of the rule include modifying a spoon that is not gold to be gold. In yet another approach, the rule may additionally and/or alternatively incorporate extending, e.g., setting geographical bounds that the rule is to apply. In one example, a rule that incorporates extending may specify that San Antonio, Texas extends Austin, Texas, and this way the base styles do not have to be defined again upon a user entering Austin from San Antonio. In yet another approach, the rule may additionally and/or alternatively nesting. A nesting rule may recognize that an object at a first geographical location should look different than an object at a second geographical location. This way, upon modifying an object, application of the nesting rule may cause the modified object to fit predetermined norms of a geographical location. For example, a nesting rule may specify that, e.g., a car in Italy may look different than a car in Mexico, clothing worn in Antarctica may look different than clothing worn in Fiji, street signs in Europe may look different than street signs in Asia, etc. CSS and/or Syntactically Awesome Style Sheets (SASS) may offer various features that the rule(s) may be based on. For example, some basic styles that that the rule may be based on include, e.g., colors, background, border, padding, margin, scaling, display, float, tooltip, opacity, etc.

Operation 210 includes crawling the code tree structure, and applying the rule to the objects during the crawling. One or more techniques for crawling a code tree structure and applying rules that would become appreciated by one of ordinary skill in the art upon reading various of the descriptions herein may be used in operation 210.

Operation 212 includes layering the modifications defined in the rule on the set of objects within the frame. A modified version of the frame is established as a result of performing the laying. This modified version of the frame may be output for display on a AR device, e.g., such as to a display of VR glasses, which are worn by a user as the user continues to view the modified frame.

As a result of application of the rule on the objects of the frame, in some approaches, the output modified version of the frame depicts the objects of the frame in a relatively earlier historical time period than a current historical time period that the objects reflect before layering the modifications. In contrast, as a result of application of the rule on the objects of the frame, in some approaches, the output modified version of the frame depicts the objects of the frame in a relatively later historical time period than a current historical time period that the objects reflect before layering the modifications. In some approaches, a layering operation may be performed a predetermined number of times and/or over a predetermined length of time to visually indicate the differences in the original and modified frame. This enables modification of the objects is phased in so that the modified frame is created over an observable timeline. This allows an observer of the frame, e.g., such as the user, to observe a historical timeline of changes of the environment, e.g., GPS location, that the frame is based on over a predetermined amount of time, e.g., preferably at a sped up pace. For example, it may be assumed that the objects of the modified frame include ancient ruins thousands of years back from modern day, and the objects of the frame before the modification and upon being analyzed were set in the modern historical period. In such an example, the laying may include replacing the objects of the frames a plurality of times over a predetermined period of time, where each replacement of the objects depicts the objects in a different previous historical period until the objects are depicted in the ancient ruins period of time. In such an approach, the layering of modifications associated with each historical period may be based on different sets of rules. In another approach, the modified objects may be toggled between the original object and the modified object in order to distinguish objects that have been updated as a result of the layering. It should be noted that some objects may not be modified and therefore, an observer of the modified frame experiences a different environment than the environment originally depicted before the layering. In some approaches, the predetermined period of time that the layering is performed may correlate with a payment plan that is received, e.g., by the AR display device. For example, in some approaches one or more payment plans may be output to a display of the AR display device, e.g., where relatively more expensive payment plans correspond to a relatively longer predetermined period of time and relatively less expensive payment plans correspond to a relatively shorter predetermined period of time. This way, a user selection may be received that may correspond to an amount of time that the user has available and/or money to watch the historical progression and/or regression within the modified frame. At the end of the predetermined period of time, e.g., upon reaching the depiction in the ancient ruins period of time, the frame may be reverted to an original state and/or the a request for an additional user selection, e.g., to continue use of the modified frame, may be output to a display of the user device.

In some approaches, layering the modifications defined in the rule on the set of objects within the frame includes modifying the nested first object and not modifying the second object. For example, it may be assumed that as a result of object detection, a first object, e.g., flowers, is nested under a second object, e.g., a human holding the flowers. In such an approach, layering the modifications may include modifying the flowers to be a carrot but not modifying the human that holds the carrot in a same orientation as the human held the flowers before the modification.

The layered modifications may be ongoingly updated as a result of the user that is observing the frame changing. This allows the user to experience the entire AR environment regardless of a GPS location of the user. For example, in response to determining that a location of an object of the frame has changed and/or a location of the user has changed, a perspective, e.g., size, orientation, speed, etc., of the objects may be updated in the modified frame. It should be noted that the layered modifications may optionally be removed from the modified frame for one or more reasons depending on the approach. For example, in one approach, the layered modifications of the objects may be reverted to an original form of the objects in response to a determination that the modified objects pose a hazard to the user, e.g., a tripping hazard, the user has become distracted to moving objects such as vehicles around the user, the user is on a course to potentially collide with the modified object, etc. This may be a particularly useful feature where objects are modified by being entirely omitted from the frame as a result of the modification. This is because the user may no longer have a perspective of the removed objects in the frame while viewing the frame through AR glasses.

By applying one or more rules to the code tree structure, and laying the modifications, an entire AR environment is themed. This is in sharp contrast to conventional techniques which merely apply filters to images in that here all objects of a frame are considered, and entire objects are modified and/or omitted and/or added to a frame to build the AR environment. Accordingly, the inventive discoveries disclosed herein with regards to use of layering modifications defined in a rule on the set of objects within a frame to thereby establish an AR environment proceed contrary to conventional wisdom.

Figure 3:
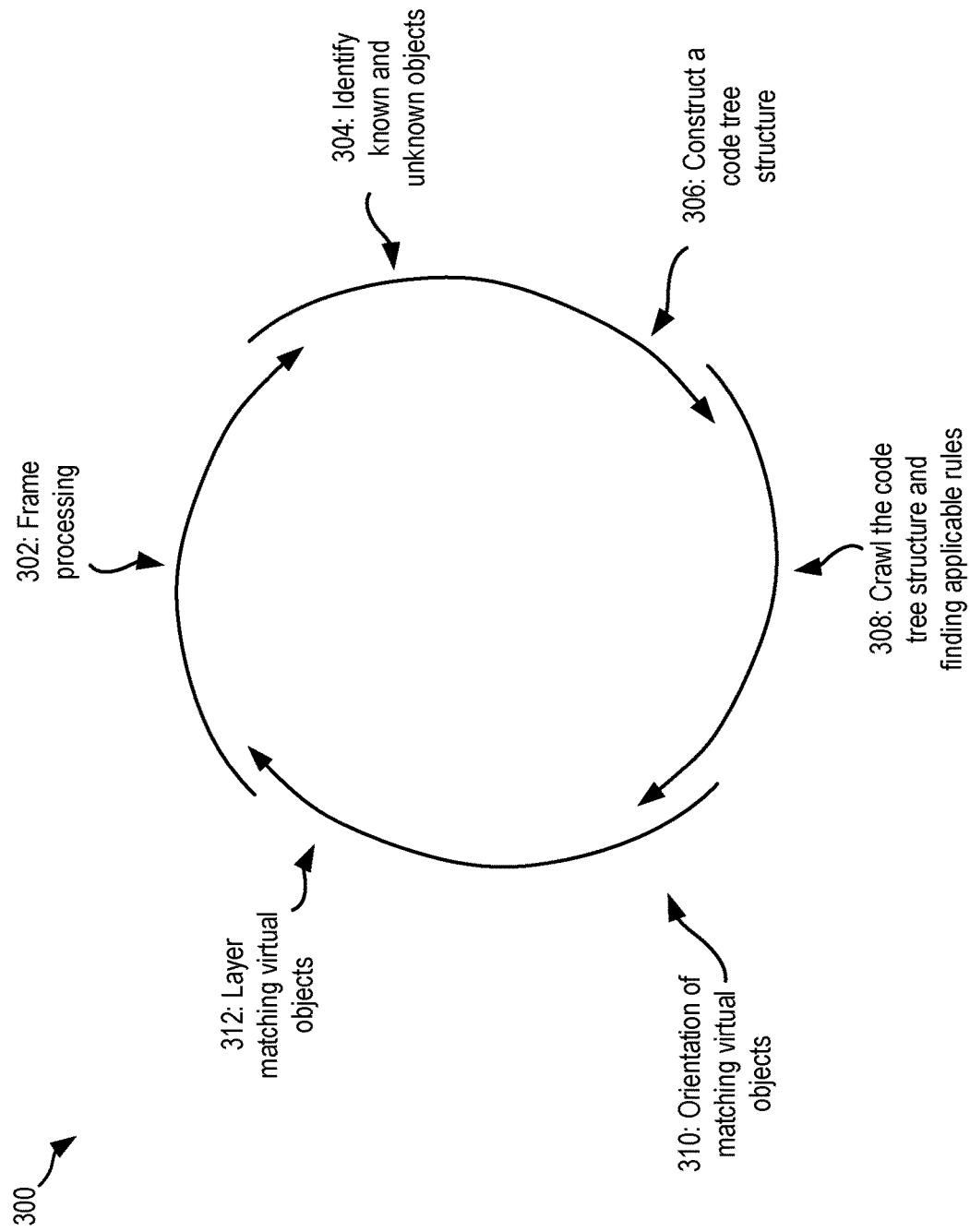
FIG. 3 is a flowchart of a method, in accordance with one embodiment of the present invention.

Now referring to FIG. 3, a flowchart of a method 300 is shown according to one embodiment. The method 200 may be performed in accordance with the present invention in any of the environments depicted in FIGS. 1-8B, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 is a relatively high level flowchart of various operations of method 200. Accordingly, various of the operations of method 300 may be performed using one or more techniques described elsewhere herein with respect to method 200. The flowchart of method 300 is illustrated to show a cyclical process for establishing an AR environment.

Operation 302 includes performing frame processing. For example, object detection may be performed on a frame to identify a set of objects within the frame. Operation 304 includes identifying known and unknown objects in the frame. In operation 306, a code tree structure is constructed. Operation 308 includes crawling the code tree structure and finding applicable rules. Orientation of matching virtual objects, e.g., objects that the rules apply to, is determined, e.g., see operation 310. Operation 312 includes layering modifications defined in a set of rules on the set of objects identified within the frame.

The cyclical process enables the frame to be ongoingly updated. In some approaches, the frame may be updated each time that a predetermined amount of time passes. These operations may be separated into sequences of actions that are repeated each iteration. Here a primary goal may be the block of sequences for each iteration. More specifically, a cache of known objects may be drawn from, and unknown objects may be identified. Style profiles may be cached to reduce computation time. In some approaches, CSS rules may be applied to find matching objects and layer virtual objects on top of these matching objects. This process allows new objects that may enter the scene depicted in the frame to be caught.

Various benefits are enabled as a result of utilizing various of the techniques described herein. For example, these techniques result in the creation of shareable styling templates via crowdsourced objects and/or company/user developed styling. In some approaches, styling templates may be created to be shared with other users and/or devices. This enables collaboration and an overall reduction of computer processing that would otherwise be performed without such collaboration enabled. These techniques are novel in that they standardize a way to theme AR, and also represent artifacts in a video game in a location-based tree.

Various companies would benefit from these techniques as a result of reading the descriptions here, e.g., such as VR or AR solution based companies. This is because techniques described herein allow users to theme an environment relatively very easily. In some approaches, this may be used by user devices or video game developer devices to simplify creation of environments by crowdsourcing other themes that have been uploaded to the system. These techniques will also become useful to movie creators that may leverage this technology to theme movies or restyle. A use case may include watching a scary movie with children, but having the children wear glasses that depict a frame having a themed version of the movie that is relatively less scary. Fitness companies also may use these techniques to have an ability to hide/restyle fast food chains or donut shops to encourage healthy eating habits. This benefits the health of humankind. An additional business value would be to corporations, companies, or entities (hereafter "entities"). Various techniques described herein may allow such entities the ability to design a relatively in depth CSS solution for an entire environment. Some examples could include applying a downloadable and/or purchasable theme to each of a plurality of different theme parks, universities or sports teams applying team based themes to a sports environment, etc.

Figure 4:
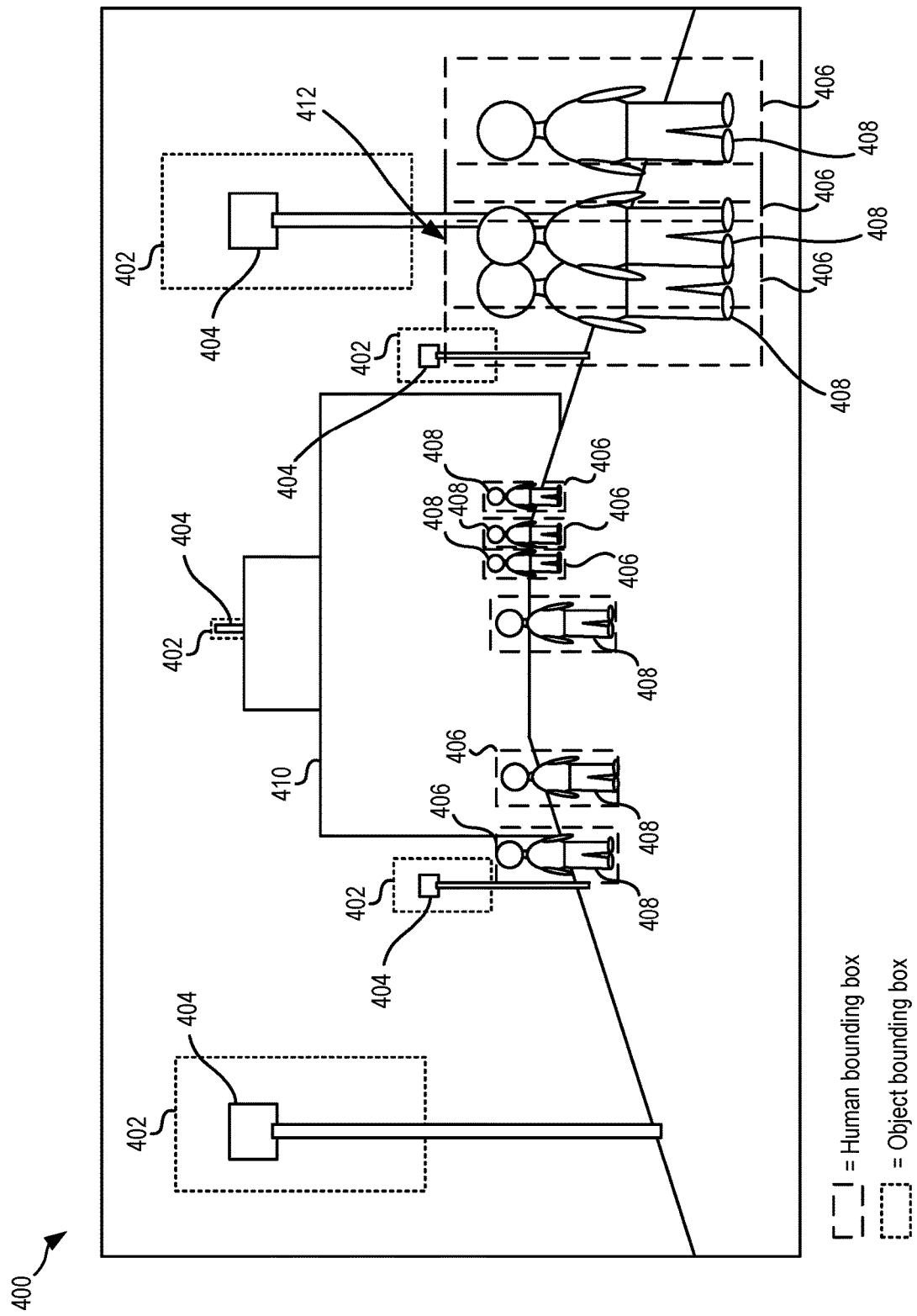
FIG. 4 is a frame, in accordance with one embodiment of the present invention.

FIG. 4 depicts a frame 400, in accordance with one embodiment. As an option, the present frame 400 may be implemented in conjunction with features from any other embodiment listed herein, such as those described with reference to the other FIGS. Of course, however, such frame 400 and others presented herein may be used in various applications and/or in permutations which may or may not be specifically described in the illustrative embodiments listed herein. Further, the frame 400 presented herein may be used in any desired environment.

With continued reference to FIG. 4, object detection has been performed on the frame 400. As a result of the object detection, a plurality of objects 404 are identified and object bounding boxes 402 are added around the identified objects 404. Furthermore, as a result of the object detection, a plurality of humans 408 are identified walking up a path to a building 410, and human bounding boxes 406 are added around the identified humans 408. It should be noted that in the present approach humans 408 are distinguished from the identified objects 404, however, in some other approaches, humans 408 may be categorized as an object 404.

It may be determined that a first of the human exists inside of a bounding box of a second of the humans, e.g., see overlap 412. In response to the determination that the overlap exists, the first human is optionally nested under the second human.

Figure 5A:
FIG. 5A is a sample of pseudo code, in accordance with one embodiment of the present invention.

FIG. 5A depicts a sample of pseudo code 500, in accordance with one embodiment. As an option, the present sample of pseudo code 500 may be implemented in conjunction with features from any other embodiment listed herein, such as those described with reference to the other FIGS. Of course, however, such sample of pseudo code 500 and others presented herein may be used in various applications and/or in permutations which may or may not be specifically described in the illustrative embodiments listed herein. Further, the sample of pseudo code 500 presented herein may be used in any desired environment.

It may be prefaced that the sample of pseudo code 500 may be used to modify objects of frames, e.g., see FIGS. 5B-5G. Accordingly, FIGS. 5B-5G depict frames 520, 540 and 560 that are considered by the sample of pseudo code 500 of FIG. 5A, in accordance with several embodiments. As an option, the present frames 520, 540, 560 may be implemented in conjunction with features from any other embodiment listed herein, such as those described with reference to the other FIGS. Of course, however, such frames 520, 540, 560 and others presented herein may be used in various applications and/or in permutations which may or may not be specifically described in the illustrative embodiments listed herein. Further, the frames 520, 540, 560 presented herein may be used in any desired environment.

The sample of pseudo code 500 of FIG. 5A may be a sample of a CSS themed file for a game. The frames in FIGS. 5B, 5D and 5F illustrate original frames 520, 540, and 560 (respectively), e.g., "before" being modified by the sample of pseudo code 500, and the frames in FIGS. 5C, 5E and 5G illustrate modified frames 520, 540, and 560 (respectively), e.g., "after" being modified by the sample of pseudo code 500.

With specific reference now to FIG. 5A, the "world" is in some approaches the highest level "parent" element, or root node of the sample of pseudo code 500. All the objects and styles are in some preferred approaches defined within this world. Furthermore, within the sample of pseudo code 500, a rule specifies that all flags in this world are to be colored blue, e.g., see .flag {and color: blue. However, it is further specified that if an object in an analyzed frame is a striped flag, e.g., see #striped flag, the object is to be replaced with strips of bacon, e.g., see replace: bacon. Furthermore, it is specified that all instances of flowers, e.g., see .flowers {, are to be replaced with carrots, e.g., see replace: carrot.

Rules included in the sample of pseudo code 500 additionally include removing, e.g., see display: none, all mold, e.g., see .city {; .wall {; and .mold {, within any part of a city depicted in a frame, and make changes to people and sewing-machines objects, e.g., see //child+sewing machine, that exist in street art, e.g., see .art {. These rules further specify that all instances of a man, e.g., see .man {, are to be replaced with a bunny, e.g., see replace: bunny, as well as all instances of a child, e.g., see .child {, are to be replaced with a pig, e.g., see replace: pig. Also, if the child has a sewing-machine, e.g., see & .sewing-machine {, the object is to be replaced with a stovetop, e.g., see replace: stovetop. However, all other sewing-machines not associated with a child, e.g., see //all sewing machines, are to be replaced with a black box, e.g., see replace: black-box.

Figure 5B:
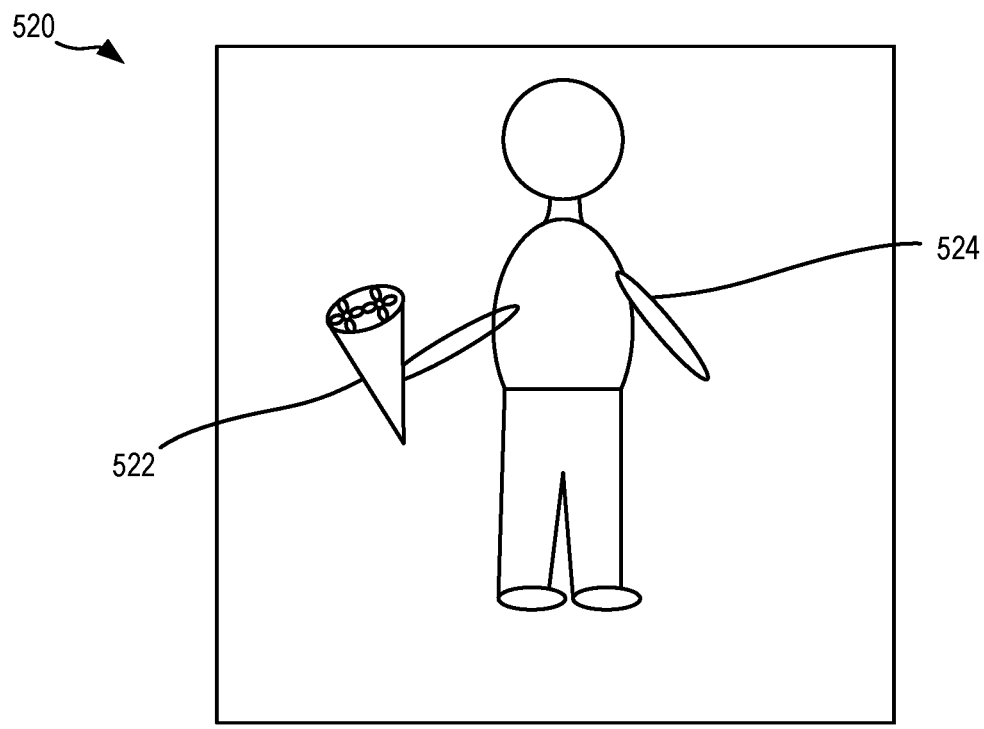
FIG. 5B is a frame with objects, in accordance with one embodiment of the present invention.
Figure 5C:
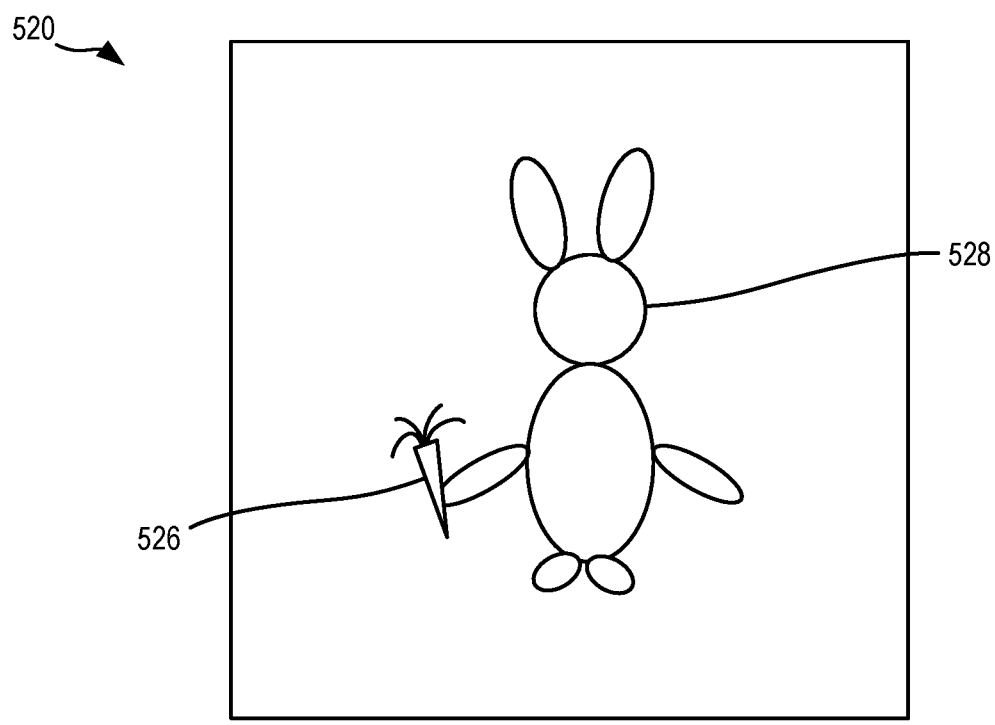
FIG. 5C is the frame of FIG. 5B, modified by the sample of pseudo code in FIG. 5A, in accordance with one embodiment of the present invention.
Figure 5D:
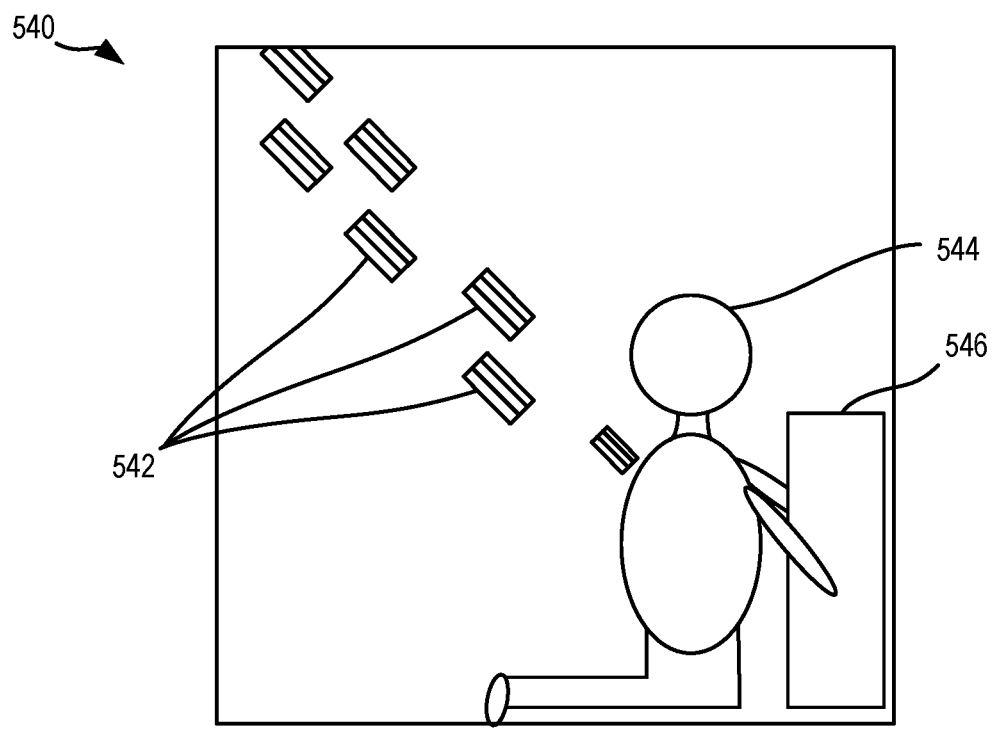
FIG. 5D is a frame with objects, in accordance with one embodiment of the present invention.
Figure 5E:
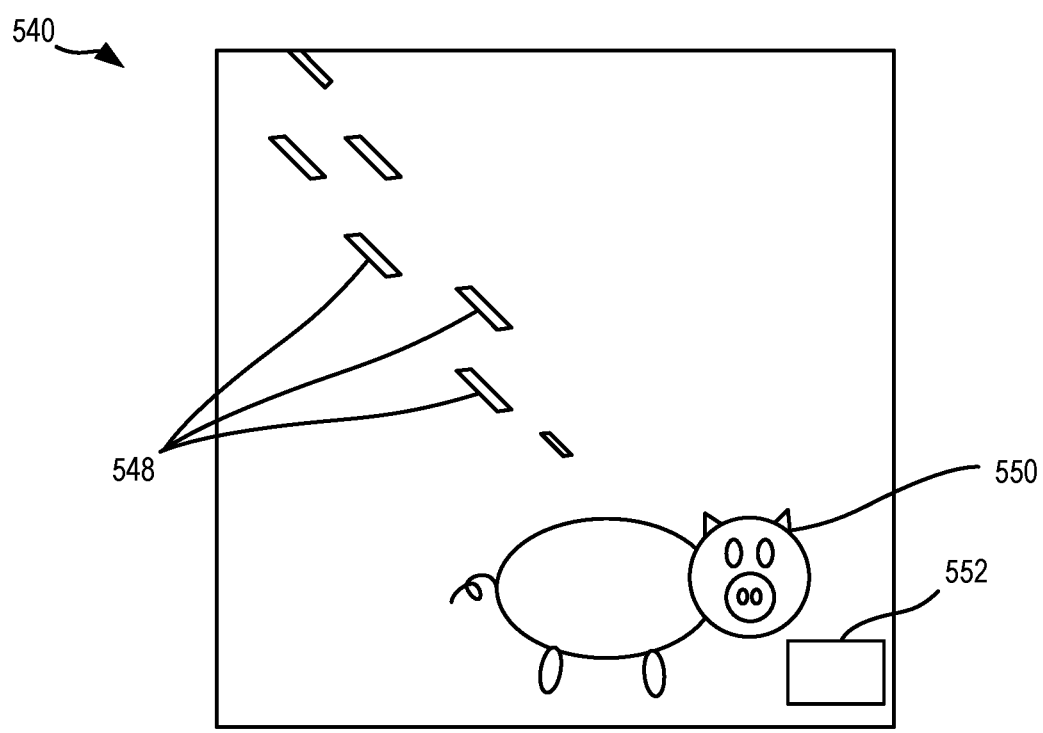
FIG. 5E is the frame of FIG. 5D, modified by the sample of pseudo code in FIG. 5A, in accordance with one embodiment of the present invention.
Figure 5F:
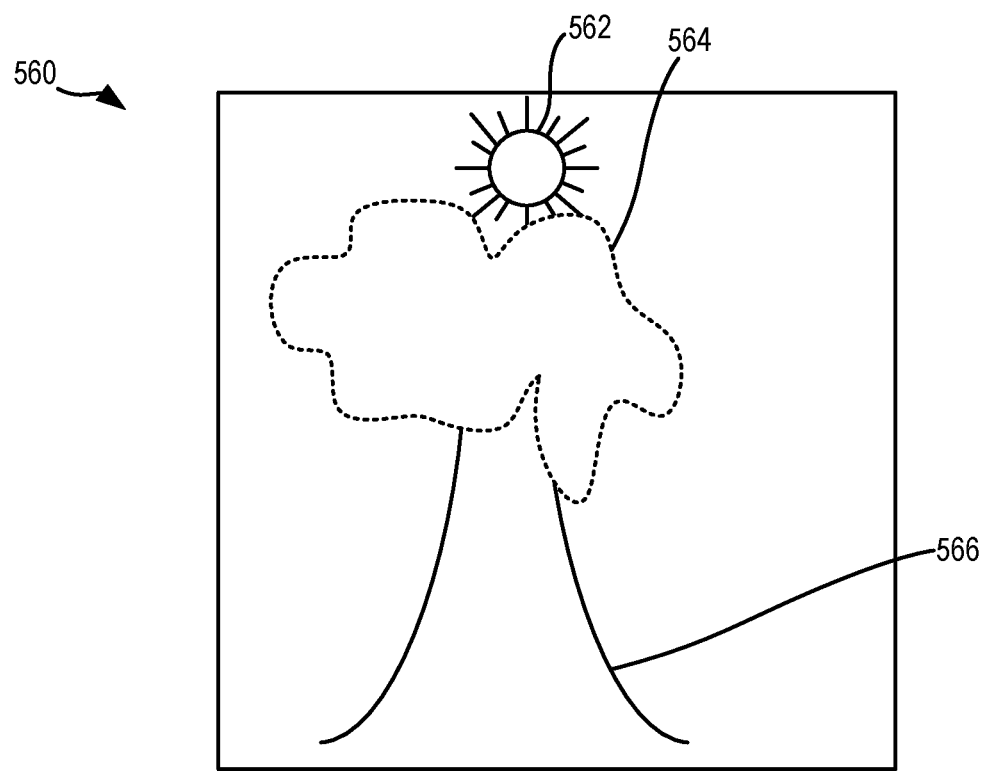
FIG. 5F is a frame with objects, in accordance with one embodiment of the present invention.
Figure 5G:
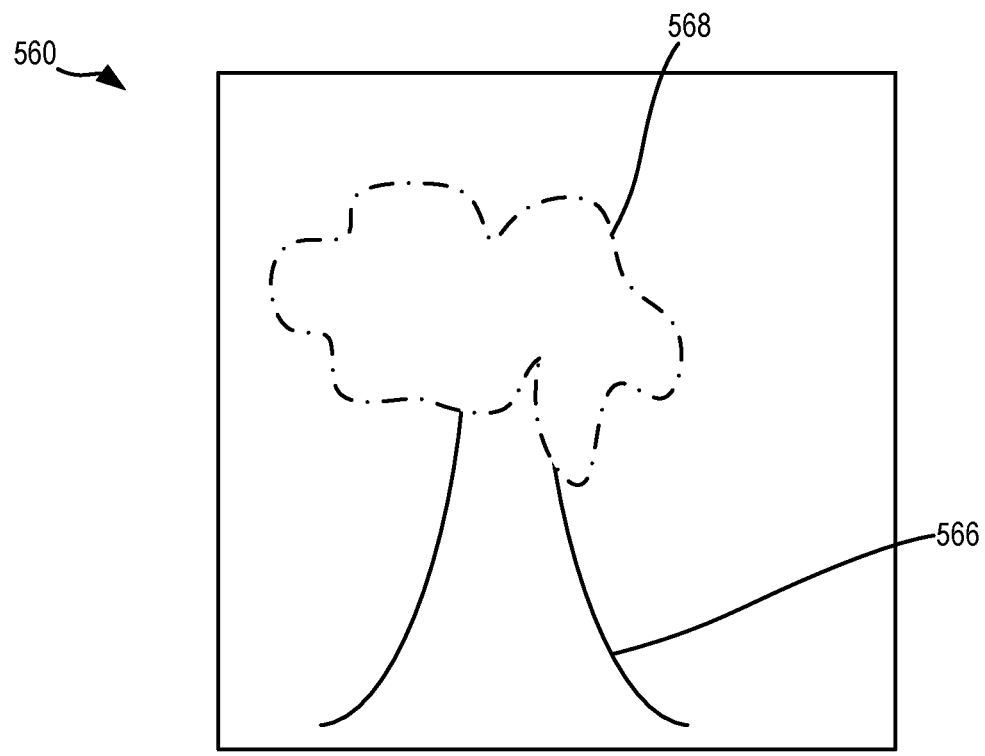
FIG. 5G is the frame of FIG. 5F, modified by the sample of pseudo code in FIG. 5A, in accordance with one embodiment of the present invention.

Frame 520 of FIG. 5B includes a man 524 that is holding flowers 522. Various of the rules of the sample of pseudo code 500 described above may be applied to the frame 520 during crawling of a code tree structure that is constructed based on the frame 520. Modifications defined in the rule on the set of objects are layered within the frame and thereby establish a modified version of the frame, e.g., see frame 520 of FIG. 5C. For example, as a result of the rule specifying that all instances of a man are to be replaced with a bunny, in FIG. 5C, the man is replaced with a bunny 528. Furthermore, as a result of the rule specifying that all instances of flowers are to be replaced with carrots, in FIG. 5C, the flowers are replaced with a carrot 526.

Frame 540 of FIG. 5D includes a child 544 kneeling in front of a sewing machine 546. Striped flags 542 are also flying into the air in the frame 540 of FIG. 5D. Various of the rules of the sample of pseudo code 500 described above may be applied to the frame 540 during crawling of a code tree structure that is constructed based on the frame 540. Modifications defined in the rule on the set of objects are layered within the frame and thereby establish a modified version of the frame, e.g., see frame 540 of FIG. 5E. For example, as a result of the rule specifying that all instances of a child are to be replaced with a pig, in FIG. 5E, the child is replaced with a pig 550. Furthermore, as a result of the rule specifying that all instances of striped flags are to be replaced with bacon, in FIG. 5E, the striped flags are replaced with strips of bacon 548. Furthermore, as a result of the rule specifying that all instances of a child and a sewing machines are to be replaced with a stovetop, in FIG. 5E, the sewing machine is replaced with a stovetop 552.

Nature-based frame 560 of FIG. 5F includes a tree 566 with spring colors and the sun 562 is shining through branches of the tree 566. Leaves of the branches of the tree 566 may be assumed to be green in color 564 based on it being springtime. As a result of applying rules during crawling of a code tree structure that is constructed based on the frame 560, objects of the frame are modified to be based on an autumn style. For example, in FIG. 5G, the color 568 of the leaves of the branches of the tree 566 may be assumed to be orange. Also, the sun 562 is removed from the frame 560 in FIG. 5G to create a AR environment that is based on the autumn style.

Figure 6A:
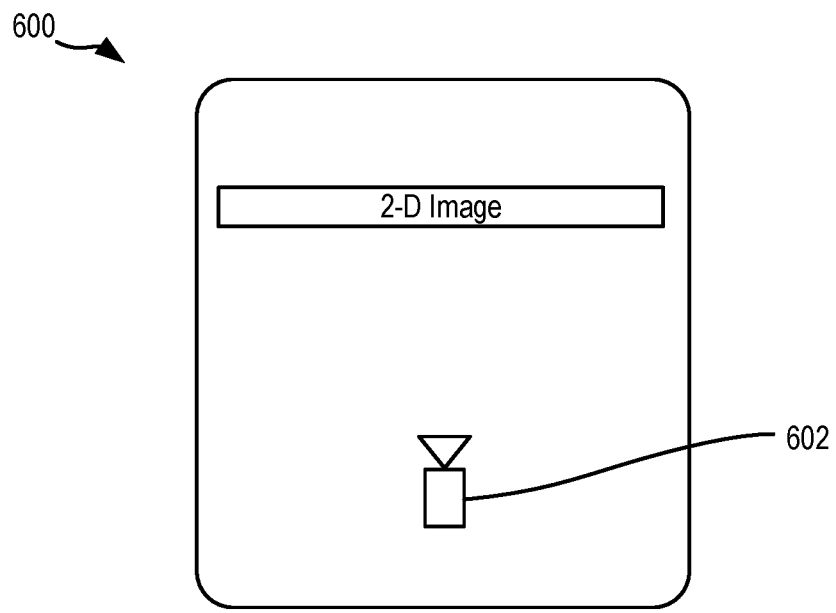
FIG. 6A is an overview of camera and frame orientations, in accordance with one embodiment of the present invention.
Figure 6B:
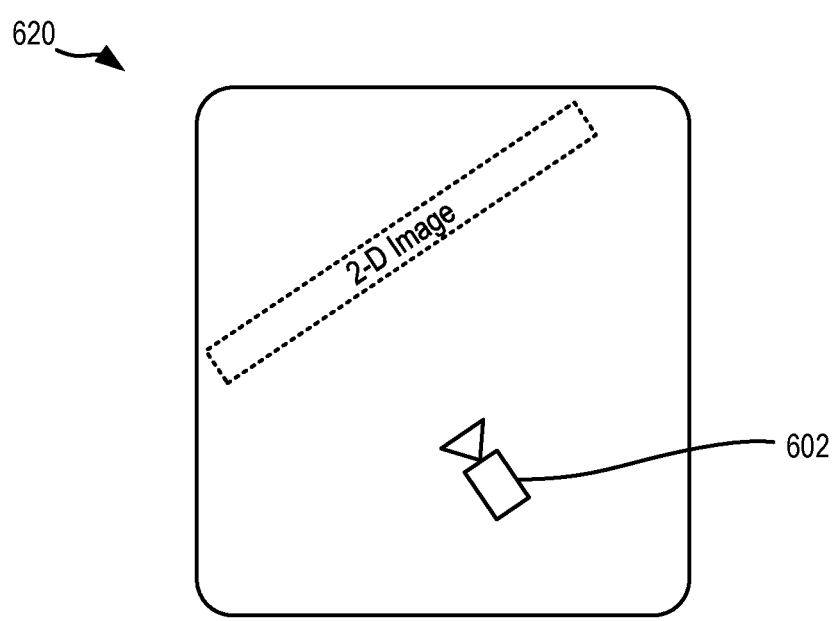
FIG. 6B is an overview of camera and frame orientations, in accordance with one embodiment of the present invention.

FIGS. 6A-6B depict overviews 600, 620 of camera and frame orientations, in accordance with several embodiments. As an option, the present overviews 600, 620 may be implemented in conjunction with features from any other embodiment listed herein, such as those described with reference to the other FIGS. Of course, however, such overviews 600, 620 and others presented herein may be used in various applications and/or in permutations which may or may not be specifically described in the illustrative embodiments listed herein. Further, the overviews 600, 620 presented herein may be used in any desired environment.

Overviews 600, 620, are orientations of camera 602 and frames, e.g., see 2-D image for layering matching virtual objects, e.g., objects that apply to rules of a rule set. In some approaches, one or more known type of bill-boarding algorithms used in games may be for replacements of 2-D images. FIGS. 6A-6B illustrate an example of how to leverage such algorithms to remain on top of a frame, e.g., the 2-D image that is being replace during layering of modifications. For example, anytime that a positioning of the camera 602 angle or position changes, e.g., see position of the 2-D image change in FIGS. 6A-6B, a resulting image may be recalculated so that it super positions the original image. This may be particularly applicable for replacing images on walls or faraway objects.

For replacements of 3-dimensional objects, a rotation and position of the object may be determined that allows the virtual object to be superimposed such that a position of the two objects are on top of one another. Because the object is already a 3-D object, there is not much processing that is called on to be performed. For example, in some approaches, existing objects may be removed from the scene using tools such as Deep Video Inpainting and SiamMask. Various examples of inpainting are described in FIGS. 7A-8B.

Figure 7A:
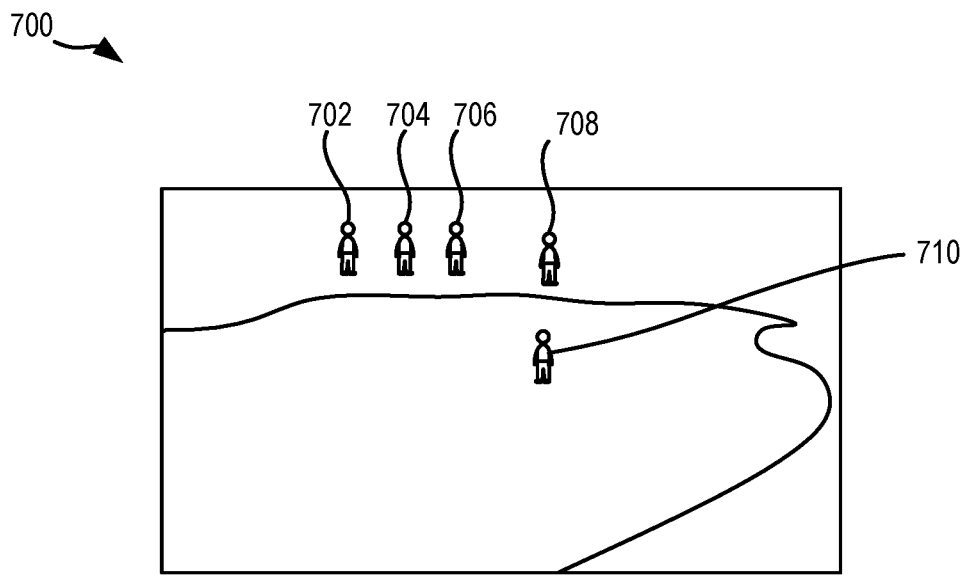
FIG. 7A is a frame, in accordance with one embodiment of the present invention.
Figure 7B:
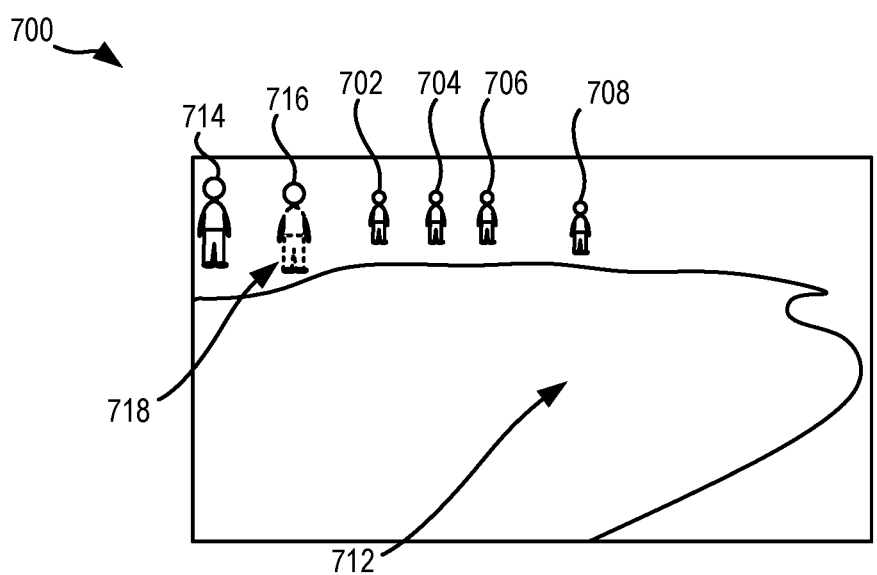
FIG. 7B is the frame of FIG. 7A with inpainting applied, in accordance with one embodiment of the present invention.

FIGS. 7A-7B depicts a frame 700, in accordance with several embodiments. As an option, the present frame 700 may be implemented in conjunction with features from any other embodiment listed herein, such as those described with reference to the other FIGS. Of course, however, such frame 700 and others presented herein may be used in various applications and/or in permutations which may or may not be specifically described in the illustrative embodiments listed herein. Further, the frame 700 presented herein may be used in any desired environment.

Referring first to FIG. 7A, the original frame 700 includes a plurality of objects, e.g., see human 702, human 704, human 706, human 708, and human 710. It may be assumed that at least one rule is applied during crawling of a code tree structure constructed based on the frame 700.

Referring now to FIG. 7B, modifications defined in the at least one rule are layered on the set of objects within the frame 700. For example, various objects are removed from the frame 700, e.g., see location 712 of frame 700 that no longer include the human 710. Furthermore, humans 714, 716 have been added to the modified frame 700, e.g., via inpainting. It may be noted that a color scheme 718 of clothing of the human 716 is also modified by the rules to be different from all of the other humans in the frame, e.g., humans 702, 704, 706, 708 and 714. In some approaches, the color scheme 718 of clothing of the human 716 may be modified according to a determined location of the human 716, e.g., lighter colors for relatively warmer environments, sports franchise brand clothing for sports environments, relatively warmer clothing for relatively colder environments, etc.

Figure 8A:
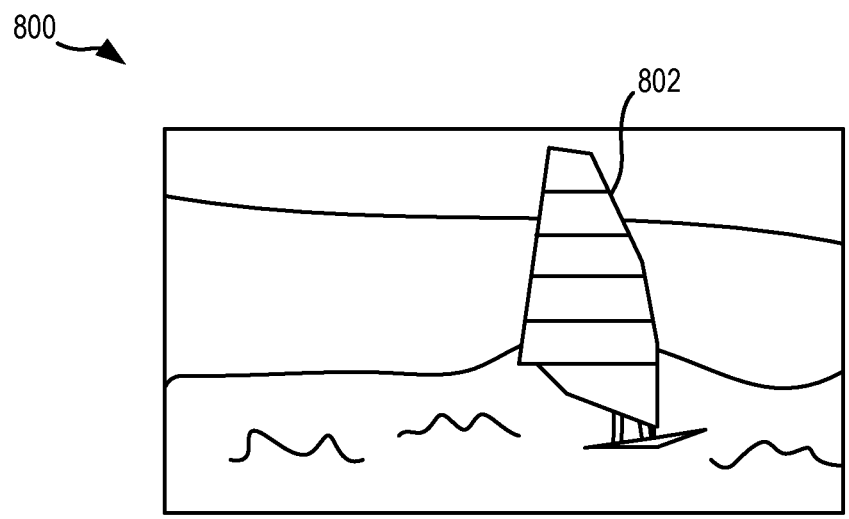
FIG. 8A is a frame, in accordance with one embodiment of the present invention.
Figure 8B:
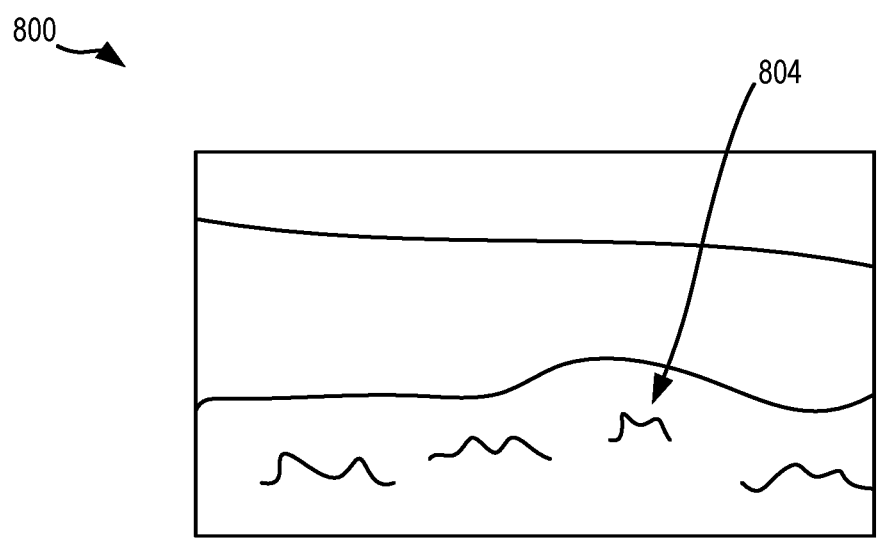
FIG. 8B is the frame of FIG. 8A with inpainting applied, in accordance with one embodiment of the present invention.

FIGS. 8A-8B depicts a frame 800, in accordance with several embodiments. As an option, the present frame 800 may be implemented in conjunction with features from any other embodiment listed herein, such as those described with reference to the other FIGS. Of course, however, such frame 800 and others presented herein may be used in various applications and/or in permutations which may or may not be specifically described in the illustrative embodiments listed herein. Further, the frame 800 presented herein may be used in any desired environment.

Referring first to FIG. 8A, the original frame 800 includes a windsurfer 802 on water.

Referring now to FIG. 8B, modifications defined in the at least one rule are layered on the set of objects within the frame 800. For example, the windsurfer is removed from location 804 in the frame 800 in FIG. 8B. Furthermore, waves are added, e.g., via inpainting, to the water at location 804 of the modified frame 800 to complete an AR environment. The added waves may be added based on a location that the windsurfer was determined to be before inpainting was applied. For example, based on a determination that the windsurfer is in the middle of the ocean windsurfing, the modification of the frame 800 may include added waves.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing a user experience with an augmented reality (AR) device by applying customization to a real world frame, the method comprising:

performing object detection on a frame to identify a set of objects within the frame, wherein the frame comprises a real world frame that captures a perspective of a physical environment that is observed by a user using an AR device and wherein the set of objects correspond to physical objects in the physical environment;

determining a location of each object of the set of objects within the frame;

constructing a code tree structure for the frame, the code tree structure defining the determined locations for the set of objects within the frame;

receiving a rule defining modifications to make to a visual display of at least one object in the set of objects within the frame;

crawling the code tree structure to apply the rule to the at least one object in the set of objects within the frame;

layering the modifications defined by the rule on the at least one object in the set of objects within the frame, wherein layering the modifications defined by the rule transforms a first object of the set of objects that is nested under a second object of the set of objects into a different object without adjustment of orientation of the second object relative to the different object; and altering a visual appearance of the at least one object in the visual display based on the rule-defined modifications during use of the AR device.

2. The computer-implemented method of claim 1, wherein the rule defines a modification to be made to a variable or an attribute associated with the at least one object in the set of objects within the frame.

3. The computer-implemented method of claim 1, wherein the rule defines a modification that comprises replacing the at least one object at a corresponding location in the code tree structure with a virtual object.

4. The computer-implemented method of claim 1, wherein the method further comprises outputting the altered visual appearance of the at least one object at a display of virtual reality (VR) glasses.

5. The computer-implemented method of claim 1, wherein the rule defines a modification that comprises:
depicting the at least one object in the set of objects in a predefined historical time period; and
layering other modifications defined by the rule on the at least one object that is depicted in the predefined historical time period.

6. The computer-implemented method of claim 1, wherein at least one of the determined locations is determined with respect to at least another one of the objects in the set of objects within the frame, wherein at least one of the determined locations is determined with respect to a GPS location of the at least another one of the objects.

7. The computer-implemented method of claim 1, wherein constructing the code tree structure for the frame includes:
identifying the first object of the set of objects that exists inside a predetermined bounding box of the second object of the set of objects; and
nesting the first object under the second object in the code tree structure,
wherein layering the modifications defined by the rule on the at least one object in the set of objects within the frame modifies the first object nested under the second object without modification of the second object.

8. The computer-implemented method of claim 1, wherein the code tree structure is a cascading style sheet (CSS) language tree.

9. The computer-implemented method of claim 1, wherein:
the rule is a nesting rule,
crawling the code tree structure comprises applying the nesting rule to the set of objects within the frame to (i) identify an object at a first geographical location and (ii) recognize that the object at the first geographical location should look different than an object at a second geographic location, and
layering the modifications defined by the rule comprises modifying the object at the first geographical location to fit predetermined norms associated with the first geographical location but not the second geographical location.

10. The computer-implemented method of claim 1, wherein in response to transforming the first object nested under the second object, the second object under the first object remains unmodified.

11. The computer-implemented method of claim 1, the method further comprising:
receiving a plurality of rules defining modifications to make to visual displays of the objects in the set of objects within the frame;
crawling the code tree structure to apply the plurality of rules to the respective objects in the set of objects within the frame, wherein one or more objects in the set of objects within the frame are nested under other objects in the set of objects; and
layering the modifications defined by the plurality of rules on the respective objects in the set of objects within the frame, wherein layering the modifications comprises applying one or more modifications to some of the objects that are nested under the other objects without applying the one or more modifications to the other objects.

12. The computer-implemented method of claim 1, further comprising continuously updating the code tree structure in response to receiving other frames, wherein the other frames capture the perspective of the physical environment that is observed by the user using the AR device as the user moves within the physical environment.

13. The computer-implemented method of claim 1, wherein receiving the rule defining the modifications to make to the visual display of the at least one object in the set of objects within the frame comprises: selecting a rule defining modifications that correspond to a current location of the user.

14. The computer-implemented method of claim 1, wherein receiving the rule defining the modifications to make to the visual display of the at least one object in the set of objects within the frame comprises: selecting a rule defining modifications that are based on an environmental context of the user.

15. The computer-implemented method of claim 1, wherein receiving the rule defining the modifications to make to the visual display of the at least one object in the set of objects within the frame comprises: selecting a rule defining modifications that correspond to a current perspective of the physical environment that is being observed by the user using the AR device.

16. The computer-implemented method of claim 1, wherein altering the visual appearance of the at least one object in the visual display causes the visual appearance of the at least one object to be different than an actual appearance of a corresponding at least one physical object in the physical environment.

17. A system for enhancing a user experience with an augmented reality (AR) device by applying customization to a real world frame, the system comprising:
- a processor; and
- logic integrated with the processor, executable by the processor, or integrated with and executable by the processor, the logic being configured to:
  - perform object detection on a frame to identify a set of objects within the frame, wherein the frame comprises a real world frame that captures a perspective of a physical environment that is observed by a user using an AR device and wherein the set of objects correspond to physical objects in the physical environment;
  - determine a location of each object of the set of objects within the frame;
  - construct a code tree structure for the frame, the code tree structure defining the determined locations for the set of objects within the frame;
  - receive a rule defining modifications to make to a visual display of at least one object in the set of objects within the frame;
  - crawl the code tree structure to apply the rule to the at least one object in the set of objects within the frame;
  - layer the modifications defined by the rule on the at least one object in the set of objects within the frame, wherein layering the modifications defined by the rule transforms a first object of the set of objects that is nested under a second object of the set of objects into a different object without adjustment of orientation of the second object relative to the different object; and
  - altering a visual appearance of the at least one object in the visual display based on the rule-defined modifications during use of the AR device.

18. The system of claim 17, wherein the rule defines a modification to be made to a variable or an attribute associated with at least one of the objects in the set of objects within the frame.

19. The system of claim 17, wherein:
- the rule is a nesting rule,
- crawling the code tree structure comprises applying the nesting rule to the set of objects within the frame to (i) identify an object at a first geographical location and (ii) recognize that the object at the first geographical location should look different than an object at a second geographic location, and
- layering the modifications defined by the rule comprises modifying the object at the first geographical location to fit predetermined norms associated with the first geographical location but not the second geographical location.

20. The system of claim 17, wherein the logic is further configured to:
- receive a plurality of rules defining modifications to make to visual displays of the objects in the set of objects within the frame;
- crawl the code tree structure to apply the plurality of rules to the respective objects in the set of objects within the frame, wherein one or more objects in the set of objects within the frame are nested under other objects in the set of objects; and
- layer the modifications defined by the plurality of rules on the respective objects in the set of objects within the frame, wherein layering the modifications comprises applying one or more modifications to some of the objects that are nested under the other objects without applying the one or more modifications to the other objects.

* * * * *